Patented Dec. 15, 1953

2,662,887

UNITED STATES PATENT OFFICE 2,662,887

SUBSTITUTED ESTERS OF CYCLIC ALCOHOLS

Frederick Leonard, Jackson Heights, N. Y., assignor to Warner-Hudnut, Inc., New York, N. Y., a corporation of Delaware No Drawing. Application July 21, 1951, Serial No. 238,029

11 Claims. (Cl. 260—293.4)

This invention relates to new compounds of pharmaceutical interest, particularly as antispasmodics.

In accordance with my invention there are produced compounds having the structural formula:

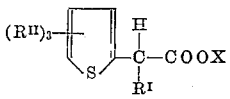

wherein $R^I$ denotes a cyclohexenyl or cyclopentenyl radical; $R^{II}$ denotes hydrogen, a short chain alkyl radical or halogen, which members may be the same or different; and X denotes a basic-nitrogen containing radical selected from the group consisting of dialkylamino-substituted cyclohexyl radicals; dialkylamino substituted mononuclear aryl hydrocarbon radicals; piperidyl and N-alkyl substituted piperidyl radicals; and 3-pyridyl radicals. These compounds have been found to possess effective antispasmodic activity.

The compounds of my invention may be readily prepared by reacting an acyl halide of the formula

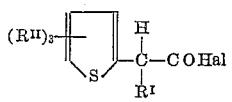

in which $R^I$ and $R^{II}$ are as above defined and Hal denotes halogen with a compound of formula X—OH, in which X is as above defined, such as the following: dialkylaminocyclohexanols such as 2-diethylaminocyclohexanol, 3 - dimethylaminocyclohexanol, 4-diethylaminocyclohexanol, 4-dimethylamino-3, 5-dimethylcyclohexanol, 3-dimethylamino-6 - isopropyl - 2 - methylcyclohexanol, 3-(N-methyl - N - ethyl) - aminocyclohexanol; piperidol and alkylpiperidols such as 1-methyl-2-piperidol, 1-ethyl-3-piperidol, 1-methyl-4-piperidol, 1,2,6-trimethyl-4 - piperidol, 1,2-dimethyl-4-isopropyl-3 - piperidol; dialkylaminophenols such as 2-diethylaminophenol, 3-dimethylaminophenol, 4-diethylaminophenol, 3,5-dimethyl-4-dimethylaminophenol, 3-dimethylamino-6-isopropyl-2 - methylphenol, 4- (N-ethyl-N-methyl) - aminophenol; and 3-pyridols such as 3-pyridol, 6-methyl-3-pyridol, 2,6-dimethyl-3-pyridol, 2,4,6-trimethyl-3-pyridol, 2-iodo-3-pyridol. This reaction may be conveniently carried out in a suitable solvent such as benzene, under reflux. The thienylacetyl chlorides from which the compounds of my invention are prepared may be readily obtained by treatment of the corresponding alpha-substituted thienylacetic acids with excess thionyl chloride in a suitable solvent such as benzene, under reflux.

The free basic esters of my invention are water-insoluble liquids. Water-soluble salts may be formed by treatment of the free bases with acids such as hydrochloric acid, hydrobromic acid, sulfuric acid, tartaric acid, citric acid or succinic acid or with suitable organic halides e. g., alkyl halides such as methyl chloride or methyl bromide, aralkyl halides such as benzyl chloride or benzyl bromide or other organic halides such as thienylmethyl chloride.

The following examples are illustrative of my invention:

EXAMPLE I

To a solution of 627 gms. (3.02 moles) of alpha-($\Delta^2$-cyclopentenyl) -2-thienylacetic acid in 1510 cc. of dry benzene, 395 gms. (3.32 moles) of thionyl chloride were added slowly, the mixture heated to boiling, and refluxed for one hour. The solvent and excess thionyl chloride were removed under vacuum and the residue distilled at 3 mm. The fraction boiling at 114°–140° C. was collected and refractionated at 2.7 mm. to give 317 gms. of pure alpha-($\Delta^2$-cyclopentenyl)-2 - thienylacetyl chloride, B. P. 121°–125° C., $n_D^{20}$ 1.555. Analysis gave the following results.

Calculated for $C_{11}H_{11}ClOS$: C=58.29, H=4.89, Cl=15.65. Found: C=58.45, H=4.70, Cl=15.60.

5.75 grams of 1-methyl-4-piperidol in 50 cc. of benzene was added slowly to a solution of 1.14 grams of alpha-($\Delta^2$-cyclopentenyl)-2-thienylacetyl chloride prepared as above described in 100 cc. of benzene, and the mixture refluxed for 4 hours. 40 cc. of water was added, followed by 10 cc. of concentrated hydrochloric acid. The resulting organic and aqueous layers were separated and the benzene solution extracted with 25 cc. of water. The combined aqueous solutions were made basic with 16 gms. of sodium hydroxide in 24 cc. of water, and the liberated base was separated from the alkali layer; the aqueous layer was extracted twice with 30 cc. portions of ether and the ether extracts combined with the base and dried over anhydrous potassium carbonate. The dried solution was then evaporated to remove the ether and the residue was distilled at one micron pressure, the fraction boiling at 130°–134° C. being recovered. This fraction was dissolved in an ether-ethyl acetate mixture the stoichiometric quantity of 2M citric acid in absolute ethanol was added. The salt crystallized, was filtered off, washed with ethyl acetate, and then with ether. The dried product weighed 7.16 gms., M. P. 142°–143° C. Recrystallization from isopropyl alcohol gave 6.24 grams of analytically pure 1-methyl-4-piperidyl alpha-($\Delta^2$-cyclopentenyl)-2-thienylacetate citrate; M. P. 141.5°–142.5° C. Anaylsis gave the following results:

Calculated for $C_{23}H_{31}NO_9S$: C=55.51, H=6.28. Found: C=55.14, H=6.26.

EXAMPLE II 5.78 grams of 2-diethylaminocyclohexanol in 50 ml. of dry benzene was added dropwise to a rapidly stirred solution of 8.15 gms. of alpha-($\Delta^2$-cyclopentenyl)-2-thienylacetyl chloride in 100 ml. of dry benzene. The mixture was refluxed for 11 hours, after which time it was cooled and 50 ml. of water added. The mixture was made basic by the addition of 16 gms. of sodium hydroxide in 24 ml. of water. The resulting organic and aqueous layers were separated and the aqueous phase extracted twice with 25-ml. portions of ether. The ether extracts and the organic phase were combined, concentrated in vacuo, and the residue distilled at 0.005 mm., giving 7.81 gms. of pure base, B. P. 127–141°, $n_D^{20}$ 1.5453. This material was dissolved in 30 ml. of absolute ethyl acetate and treated with the stoichiometric amount of 3.75N ethanolic HBr. The salt was crystallized by concentrating the solution in vacuo, covering the residue with absolute ether, and chilling for several days. The yield of crude hydrobromide was 5.6 gms. M. P. 146.5–148.5° C. The crude product was decolorized by refluxing an ethyl acetate solution thereof with 0.6 gms. of Norit A, filtering off the carbon, and adding Skellysolve B to the appearance of turbidity in order to crystallize the salt. 3.97 gms. of hydrobromide, M. P. 151.5–153.5° C. was thus obtained which on further recrystallizations gave 1.94 grams of analytically pure 2-diethylaminocyclohexyl alpha-($\Delta^2$-cyclopentenyl)-2-thienylacetate hydrobromide; M. P. 153–154° C. Analysis gave the following results:

Calculated for $C_{21}H_{32}BrNO_2S$: C=57.00, H=7.29, Br=18.06. Found: C=56.75, H=7.10, Br=18.07.

EXAMPLE III

To a stirred, refluxing mixture of 4.8 gms. of 3-pyridol and 5.6 gms. of triethylamine in 150 cc. of dry benzene, was added slowly 11.3 gms. of alpha-($\Delta^2$-cyclopentenyl)-2-thienylacetyl chloride in 25 cc. of dry benzene. The reaction mixture was refluxed for 8 hours followed by filtration to remove the precipitated triethylamine hydrochloride.

The filtrate was concentrated under vacuum and the residue distilled at less than 1 micron pressure; yield of base, 11.59 gms., B. P. 125–145°, $n_D^{20}$ 1.5729.

The base was converted to the hydrochloride by dissolving it in ethyl acetate, adding the equivalent quantity of 4.92N HCl in ethanol, concentrating in vacuo, covering the residue with ether, and chilling; 10.69 gms. of crude salt, M. P. 98–99° C., were obtained.

The product was recrystallized 3 times from 99% isopropyl alcohol-ether mixtures; yield of analytically pure 3-pyridyl alpha-($\Delta^2$-cyclopentenyl)-2-thienylacetate hydrochloride, 1.57 gms, M. P. 121–122.5° C. Analysis gave the following results:

Calculated for $C_{17}H_{18}ClNO_2S$: C=59.71, H=5.02, Cl=11.02. Found: C=59.56, H=5.03, Cl=11.05.

By substituting for the alpha-($\Delta^2$-cyclopentenyl)-2-thienylacetyl chloride used in the above examples, equivalent amounts of alpha-($\Delta^2$-cyclohexenyl)-2-thienylacetyl chloride, corresponding cyclohexenyl derivatives were obtained. Other compounds within the scope of the present invention include: 4-diethylaminocyclohexyl alpha-($\Delta^2$-cyclopentenyl)-2-thienylacetate, 3-(N-methyl-N-ethyl)-aminocyclohexyl alpha-($\Delta^2$-cyclopentenyl)-2-thienylacetate, 3-dimethylamino-6-isopropyl-2-methylcyclohexyl alpha-($\Delta^2$-cyclohexenyl)-2-thienylacetate, 1-methyl-2-piperidyl alpha-($\Delta^2$-cyclopentenyl)-2-thienylacetate, 1,2-dimethyl-4-isopropyl-3-piperidyl alpha-($\Delta^2$-cyclohexenyl)-2-thienylacetate, 2-diethylaminophenyl alpha-($\Delta^2$-cyclohexenyl)-2-thienylacetate, 3-dimethylaminophenyl alpha-($\Delta^2$-cyclohexenyl)-2-thienylacetate, 3,5-dimethyl-4-dimethylaminophenyl alpha-($\Delta^2$-cyclopentenyl)-2-thienylacetate, 4-(N-ethyl-N-methyl)-aminophenyl alpha-($\Delta^2$-cyclopentenyl)-2-thienylacetate, 6-methyl-3-pyridyl alpha-($\Delta^2$-cyclophentenyl)-2-thienylacetate, 2,4,6-trimethyl-3-pyridyl alpha-($\Delta^2$-cyclohexenyl)-2-thienylacetate, 2-iodo-3-pyridyl alpha-($\Delta^2$-cyclohexenyl)-2-thienylacetate, 1-methyl-4-piperidyl alpha-($\Delta^2$-cyclohexenyl)-3-methyl-2-thienylacetate, 1-methyl-2-piperidyl alpha-($\Delta^2$-cyclopentenyl)-4-chloro-2-thienylacetate, as well as water-soluble salts of these basic esters obtained in accordance with the foregoing disclosure.

Since certain changes may be made in the compounds above described without departing from the scope of my invention, it is intended that all matter contained in the above description shall be interpreted as illustrative, and not in a limiting sense.

I claim:

1. A compound selected from the group consisting of compounds having the generic formula:

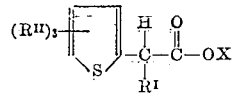

Wherein $R^I$ denotes a member selected from the group consisting of cyclohexenyl and cyclopentenyl radicals, $R^{II}$ denotes a member selected from the group consisting of hydrogen, short chain alkyl radicals and halogens; and X is a cyclic radical attached to the oxygen at a nuclear carbon atom, said cyclic radical being selected from the group consisting of di(lower alkyl) amino-substituted cyclohexyl radicals, the di(lower alkyl) amino-substituted phenyl radicals, the piperidyl and N-short chain alkyl substituted piperidyl radicals and 3-pyridyl radicals, and salts thereof.

2. Salts of the compound 1-methyl-4-piperidyl alpha-($\Delta^2$-cyclopentenyl)-2-thienylacetate.

3. Salts of the compound 1-methyl-4-piperidyl alpha-($\Delta^2$-cyclohexenyl)-2-thienylacetate.

4. Salts of the compound 3-pyridyl alpha-($\Delta^2$-cyclopentenyl)-2-thienylacetate.

5. Salts of the compound 3-pyridyl alpha-($\Delta^2$-cyclohexenyl)-2-thienylacetate.

6. Salts of the compound 2-diethylaminocyclohexyl alpha-($\Delta^2$-cyclopentenyl)-2-thienylacetate.

7. The compound 1-methyl-4-piperidyl alpha-($\Delta^2$-cyclopentenyl)-2-thienylacetate.

8. The compound 1-methyl-4-piperidyl alpha-($\Delta^2$-cyclohexenyl)-2-thienylacetate.

9. The compound 3-pyridyl alpha-($\Delta^2$-cyclopentenyl)-2-thienylacetate.

10. The compound 3-pyridyl alpha-($\Delta^2$-cyclohexenyl)-2-thienylacetate.

11. The compound 2-diethylaminocyclohexyl alpha-($\Delta^2$-cyclopentenyl)-2-thienylacetate.

FREDERICK LEONARD.

References Cited in the file of this patent

UNITED STATES PATENTS

| Number | Name | Date |
|---|---|---|
| 2,507,449 | Martin et al. | May 9, 1950 |
| 2,533,002 | Feldkamp | Dec. 5, 1950 |
| 2,538,795 | Moffett | Jan. 23, 1951 |
| 2,541,634 | Blicke | Feb. 13, 1951 |
| 2,561,385 | Leonard | July 24, 1951 |

FOREIGN PATENTS

| Number | Country | Date |
|---|---|---|
| 625,811 | Great Britain | July 5, 1949 |